(12) United States Patent
Tsujiwaki et al.

(10) Patent No.: US 10,391,457 B2
(45) Date of Patent: Aug. 27, 2019

(54) POROUS FILTER

(71) Applicant: SUMITOMO ELECTRIC FINE POLYMER, INC., Sennan-gun, Osaka (JP)

(72) Inventors: Hiroyuki Tsujiwaki, Osaka (JP); Atsushi Uno, Osaka (JP); Fumihiro Hayashi, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 237 days.

(21) Appl. No.: 15/304,867

(22) PCT Filed: May 25, 2015

(86) PCT No.: PCT/JP2015/064860
§ 371 (c)(1),
(2) Date: Oct. 18, 2016

(87) PCT Pub. No.: WO2015/182538
PCT Pub. Date: Dec. 3, 2015

(65) Prior Publication Data
US 2017/0157568 A1   Jun. 8, 2017

(30) Foreign Application Priority Data
May 30, 2014   (JP) .................. 2014-113522

(51) Int. Cl.
*B01D 69/02* (2006.01)
*B01D 69/12* (2006.01)
(Continued)

(52) U.S. Cl.
CPC .......... *B01D 69/02* (2013.01); *B01D 61/147* (2013.01); *B01D 69/12* (2013.01); *B01D 71/36* (2013.01); *B32B 3/266* (2013.01); *B32B 5/32* (2013.01); *B32B 7/02* (2013.01); *B32B 7/04* (2013.01); *B32B 27/08* (2013.01); *B32B 27/322* (2013.01); *B01D 2325/20* (2013.01);
(Continued)

(58) Field of Classification Search
CPC ...... B01D 69/02; B01D 61/147; B01D 71/36; B01D 69/12; B01D 2325/20; B32B 27/322; B32B 27/08; B32B 5/32; B32B 2307/726; B32B 2307/724
See application file for complete search history.

(56) References Cited

U.S. PATENT DOCUMENTS

| | | | | | |
|---|---|---|---|---|---|
| 5,476,589 | A | * | 12/1995 | Bacino | ............... B01D 39/1692 210/500.36 |
| 6,130,175 | A | * | 10/2000 | Rusch | ................... B01D 69/10 442/77 |
| 6,143,675 | A | * | 11/2000 | McCollam | ............... B32B 5/32 442/221 |

FOREIGN PATENT DOCUMENTS

| | | |
|---|---|---|
| JP | H11-501961 A | 2/1999 |
| JP | 2009-501632 A | 1/2009 |

(Continued)

*Primary Examiner* — Taiwo Oladapo
(74) *Attorney, Agent, or Firm* — Drinker Biddle & Reath LLP

(57) ABSTRACT

A porous filter includes a porous laminate in which a plurality of biaxially stretched porous sheets made of PTFE are stacked. The Gurley number G and the bubble point B (kPa) of the porous laminate satisfy the following expressions (1) and (2):

$$\log G > 3.7 \times 10^{-3} \times B - 0.8 \quad (1)$$

$$\log G < 4.9 \times 10^{-3} \times B + 0.45 \quad (2).$$

4 Claims, 1 Drawing Sheet

(51) Int. Cl.

| | | |
|---|---|---|
| *B01D 71/36* | (2006.01) | |
| *B32B 5/32* | (2006.01) | |
| *B01D 61/14* | (2006.01) | |
| *B32B 27/08* | (2006.01) | |
| *B32B 27/32* | (2006.01) | |
| *B32B 7/02* | (2019.01) | |
| *B32B 7/04* | (2019.01) | |
| *B32B 3/26* | (2006.01) | |

(52) U.S. Cl.
CPC ....... *B32B 2250/02* (2013.01); *B32B 2250/03* (2013.01); *B32B 2250/04* (2013.01); *B32B 2250/05* (2013.01); *B32B 2250/242* (2013.01); *B32B 2260/046* (2013.01); *B32B 2262/101* (2013.01); *B32B 2264/0207* (2013.01); *B32B 2264/0214* (2013.01); *B32B 2264/101* (2013.01); *B32B 2264/102* (2013.01); *B32B 2264/104* (2013.01); *B32B 2264/105* (2013.01); *B32B 2264/108* (2013.01); *B32B 2307/30* (2013.01); *B32B 2307/4026* (2013.01); *B32B 2307/50* (2013.01); *B32B 2307/518* (2013.01); *B32B 2307/54* (2013.01); *B32B 2307/554* (2013.01); *B32B 2307/724* (2013.01); *B32B 2307/726* (2013.01); *B32B 2307/732* (2013.01); *B32B 2457/14* (2013.01); *B32B 2457/202* (2013.01)

(56) References Cited

FOREIGN PATENT DOCUMENTS

| JP | 2010-094579 A | 4/2010 |
|---|---|---|
| WO | WO-2008/018400 A1 | 2/2008 |

* cited by examiner

POROUS FILTER

TECHNICAL FIELD

The present invention relates to a porous filter.

BACKGROUND ART

Porous filters made of polytetrafluoroethylene (PTFE) have characteristics of PTFE, such as high heat resistance, chemical stability, weather resistance, a fireproof property, high strength, non-adhesiveness, and a low friction coefficient, and also have characteristics of a porous material, such as flexibility, liquid permeability, particle retention, and a low dielectric constant. Therefore, porous filters made of PTFE have been widely used as microfiltration filters for liquid and gas in the semiconductor field, the liquid crystal field, and the food and medical treatment fields.

In such fields, because of further technological innovation and increasing requirements, there has been a demand for microfiltration filters having higher performance. Specifically, in the semiconductor field and the liquid crystal field, the degree of integration has been increasing year by year, and photoresists have been used in fine regions with a width of 0.5 μm or less. Therefore, there is a need for microfiltration filters that can reliably retain such fine particles. These microfiltration filters are used mainly as filters for treating the outside air in clean rooms, filters for filtration of chemical solutions, and the like, and their performance affects the yield of products. Furthermore, in the food and medical treatment fields, along with recent increases in safety awareness, there has been a strong demand for filters having a high removability of very small pieces of foreign matter.

In order to meet such demands, a porous filter in which a porous sheet made of PTFE capable of retaining fine particles with a particle diameter of less than 0.1 μm is used has been proposed (refer to Japanese Unexamined Patent Application Publication No. 2010-94579).

CITATION LIST

Patent Literature

PTL 1: Japanese Unexamined Patent Application Publication No. 2010-94579

SUMMARY OF INVENTION

Technical Problem

Furthermore, porous filters also require a low cost. However, in existing porous filters, when the pore size is decreased in order to improve fine particle retention performance, the pressure drop increases. Accordingly, there is a trade-off relationship between improvement in retention performance and reduction in energy required for filtration, and it is not easy to reduce filtration cost.

The present invention has been accomplished under the circumstances described above. It is an object of the present invention to provide a porous filter in which both improvement in fine particle retention performance and reduction in filtration cost can be achieved.

Solution to Problem

In order to solve the problem described above, a porous filter according to an embodiment of the present invention includes a porous laminate in which a plurality of biaxially stretched porous sheets made of PTFE are stacked. The Gurley number G and the bubble point B (kPa) of the porous laminate satisfy the following expressions (1) and (2):

$$\log G > 3.7 \times 10^{-3} \times B - 0.8 \quad (1)$$

$$\log G < 4.9 \times 10^{-3} \times B + 0.45 \quad (2)$$

Advantageous Effects of Invention

In the porous filter of the present invention, it is possible to achieve both improvement in fine particle retention performance and reduction in filtration cost, and therefore, the porous filter can be suitably used as a microfiltration filter.

Figure 1:
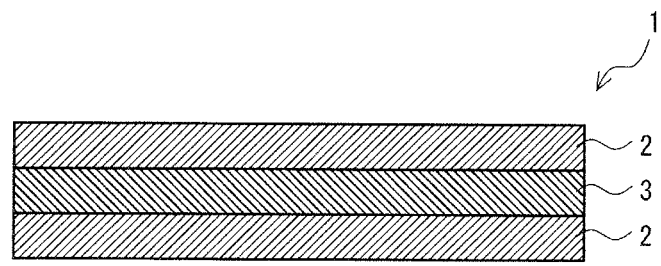
FIG. 1 is a schematic cross-sectional view of a porous filter according to an embodiment of the present invention.

REFERENCE SIGNS LIST 1, 11 porous laminate
2 support layer
3 retention layer

DESCRIPTION OF EMBODIMENTS

Description of Embodiments of the Present Invention

A porous filter according to an embodiment of the present invention includes a porous laminate in which a plurality of biaxially stretched porous sheets made of PTFE are stacked. The Gurley number G and the bubble point B (kPa) of the porous laminate satisfy the following expressions (1) and (2):

$$\log G > 3.7 \times 10^{-3} \times B - 0.8 \quad (1)$$

$$\log G < 4.9 \times 10^{-3} \times B + 0.45 \quad (2)$$

In the porous filter, since the Gurley number and the bubble point of the porous laminate satisfy the expressions (1) and (2), even when the bubble point is increased, the increase in the Gurley number is reduced. That is, in the porous filter, even when the bubble point is increased in order to achieve required fine particle retention performance, the Gurley number can be maintained at a low level on the basis of the expression (2). Consequently, in the porous filter, while reducing the filtration cost by suppressing an increase in pressure drop, it is possible to improve fine particle retention performance. Furthermore, the porous filter maintains the existing trade-off relationship between the bubble point and the Gurley number in which the Gurley number increases with an increase in the bubble point on the basis of the expression (1) within a certain range. Therefore, since the materials and design method for existing porous filters are applicable to the porous filter, the porous filter can be produced at low cost.

The Gurley number G and the bubble point B of the porous laminate may satisfy the following expression (3):

$$\log G > 1.9 \times 10^{-3} \times B \quad (3)$$

By setting the Gurley number and the bubble point to further satisfy the expression (3) whose slope is less steep than that of the expression (1), the rate of rise of the bubble point can be further reduced when the fine particle retention performance is increased, and the effect of reducing the filtration cost can be further enhanced.

The Gurley number G of the porous laminate is preferably 100 seconds or less. By setting the Gurley number of the porous laminate to be 100 seconds or less, the effect of reducing the filtration cost can be further enhanced.

The bubble point B of the porous laminate is preferably 200 to 600 kPa. By setting the bubble point of the porous laminate in the range described above, it is possible to facilitate achievement of both improvement in fine particle retention performance and reduction in filtration cost.

The porous laminate may include a pair of support layers disposed as outermost layers, and one or a plurality of retention layers disposed between the pair of support layers, in which the mean pore diameter of the support layers is larger than the mean pore diameter of the retention layers. By configuring the porous laminate in such a manner, it is possible to increase the mechanical strength and life of the porous laminate while improving retention performance.

Note that the "Gurley number" is measured in accordance with JIS-P8117 (2009) and means the time required for 100 cm$^3$ of air to pass through 6.45 cm$^2$ of a sample at an average differential pressure of 1.22 kPa. The "bubble point" is a value measured in accordance with ASTM-F-316, using isopropyl alcohol as a test liquid.

DETAILED DESCRIPTION OF EMBODIMENTS OF THE PRESENT INVENTION

An embodiment of a porous filter according to the present invention will be described in detail with reference to the drawings. Note that in the porous filter, the "inside and outside" do not mean the inside and outside in the usage state of the porous filter.

A porous filter shown in FIG. 1 includes mainly a porous laminate 1 in which a plurality of biaxially stretched porous sheets made of PTFE are stacked. The porous laminate 1 includes a pair of support layers 2 disposed as outermost layers and a retention layer 3 disposed between the pair of support layers 2, i.e., three layers in total.

<Support Layer>

A support layer 2 is composed of a biaxially stretched porous sheet made of PTFE. The biaxially stretched porous sheet is obtained by stretching a sheet containing PTFE as a main component in two orthogonal directions so that the sheet becomes porous. The term "main component" refers to a component whose content is highest and, for example, refers to a component whose content is 50% by mass or more.

The upper limit of the average thickness of the support layer 2 is preferably 20 µm and more preferably 15 µm. On the other hand, the lower limit of the average thickness of the support layer 2 is preferably 2 µm and more preferably 5 µm. When the average thickness of the support layer 2 is more than the upper limit, there is a concern that the pressure drop of the porous filter may increase. On the other hand, when the average thickness of the support layer 2 is less than the lower limit, there is a concern that the strength of the porous filter may become insufficient.

The upper limit of the mean pore diameter of the support layer 2 is preferably 100 times, more preferably 80 times, the mean pore diameter of the retention layer 3 which will be described later. On the other hand, the lower limit of the mean pore diameter of the support layer 2 is preferably 2 times, more preferably 10 times, the mean pore diameter of the retention layer 3. When the mean pore diameter of the support layer 2 is more than the upper limit, there is a concern that the strength of the support layer 2 may become insufficient. On the other hand, when the mean pore diameter of the support layer 2 is less than the lower limit, there is a concern that the pressure drop of the porous filter may increase. The "mean pore diameter" means the average diameter of pores of the outer surface of the support layer 2, and can be measured by a micropore distribution measuring instrument (for example, a Perm Porometer "CFP-1200A" of PMI Corp).

The upper limit of the porosity of the support layer 2 is preferably 2.5 times, more preferably 2 times, the porosity of the retention layer 3 which will be described later. On the other hand, the lower limit of the porosity of the support layer 2 is preferably 1 times, more preferably 1.2 times, the porosity of the retention layer 3. When the porosity of the support layer 2 is more than the upper limit, there is a concern that the strength of the support layer 2 may become insufficient. On the other hand, when the porosity of the support layer 2 is less than the lower limit, there is a concern that the pressure drop of the porous filter may increase. The term "porosity" refers to the ratio of the total volume of pores to the volume of the support layer 2, and can be determined by measuring the density of the support layer 2 in accordance with ASTM-D-792.

The lower limit of the stretching ratio in the first direction (longitudinal direction) of the biaxially stretched porous sheet constituting the support layer 2 is preferably 3 times, and more preferably 4 times. On the other hand, the upper limit of the stretching ratio in the first direction of the biaxially stretched porous sheet constituting the support layer 2 is preferably 15 times, and more preferably 6 times. Furthermore, the lower limit of the stretching ratio in the second direction (lateral direction) of the biaxially stretched porous sheet constituting the support layer 2 is preferably 10 times, and more preferably 20 times. On the other hand, the upper limit of the stretching ratio in the second direction of the biaxially stretched porous sheet constituting the support layer 2 is preferably 50 times, and more preferably 30 times. When the stretching ratio in the first direction or the second direction of the biaxially stretched porous sheet is less than the lower limit, there is a concern that the open porosity of the support layer 2 may become insufficient or the shape of pores may become non-circular. On the other hand, when the stretching ratio in the first direction or the second direction of the biaxially stretched porous sheet is more than the upper limit, there is a concern that cracks may occur in the support layer 2 or the size of pores may increase unnecessarily.

<Retention Layer>

A retention layer 3 is composed of a biaxially stretched porous sheet made of PTFE as the support layer 2.

The average thickness of the retention layer 3 is preferably set larger than the average thickness of the support layer 2. The upper limit of the average thickness of the retention layer 3 is preferably 25 µm and more preferably 20 µm. On the other hand, the lower limit of the average thickness of the retention layer 3 is preferably 5 µm and more preferably 8 µm. When the average thickness of the retention layer 3 is more than the upper limit, there is a concern that the pressure drop of the porous filter may increase. On the other hand, when the average thickness of the retention layer 3 is less than the lower limit, there is a concern that the filtration capability of the porous filter may become insufficient.

The upper limit of the mean pore diameter of the retention layer 3 is preferably 0.45 μm and more preferably 0.2 μm. On the other hand, the lower limit of the mean pore diameter of the retention layer 3 is preferably 0.01 μm and more preferably 0.05 μm. When the mean pore diameter of the retention layer 3 is more than the upper limit, there is a concern that the filtration capability of the porous filter may become insufficient. On the other hand, when the mean pore diameter of the retention layer 3 is less than the lower limit, there is a concern that the pressure drop of the porous filter may increase.

The upper limit of the porosity of the retention layer 3 is preferably 90% and more preferably 80%. On the other hand, the lower limit of the porosity of the retention layer 3 is preferably 40% and more preferably 50%. When the porosity of the retention layer 3 is more than the upper limit, there is a concern that the filtration capability of the porous filter may become insufficient. On the other hand, when the porosity of the retention layer 3 is less than the lower limit, there is a concern that the pressure drop of the porous filter may increase.

The stretching ratios in the first direction (longitudinal direction) and the second direction (lateral direction) of the biaxially stretched porous sheet constituting the retention layer 3 can be set within the same ranges as those for the support layer 2.

<Porous Laminate>

The porous laminate 1 includes a pair of support layers and a retention layer 3 disposed between the support layers 2 as described above. The boundary surfaces of the individual layers are fusion bonded to one another, and pores of the support layer 2 three-dimensionally communicate with pores of the retention layer 3. Specifically, the biaxially stretched porous sheet constituting the support layer 2 or the retention layer 3 has a fibrous skeleton in which flexible fibrous bodies are linked together by node portions in a three-dimensional network shape, and a plurality of pores are formed in a region surrounded by the fibrous skeleton. In the porous laminate 1, the plurality of pores three-dimensionally communicate with one another through the individual layers.

The upper limit of the average thickness of the porous laminate 1 is preferably 50 μm and more preferably 40 μm. On the other hand, the lower limit of the average thickness of the porous laminate 1 is preferably 15 μm and more preferably 20 μm. When the average thickness of the porous laminate 1 is more than the upper limit, there is a concern that the pressure drop of the porous filter may increase. On the other hand, when the average thickness of the porous laminate 1 is less than the lower limit, there is a concern that the strength of the porous filter may become insufficient.

The lower limit of the tensile strength in each of the first direction (longitudinal direction) and the second direction (lateral direction) of the porous laminate 1 is preferably 10 N and more preferably 12 N. On the other hand, the upper limit of the tensile strength in each of the first direction and the second direction of the porous laminate 1 is preferably 20 N and more preferably 18 N. When the tensile strength of the porous laminate 1 is less than the lower limit, there is a concern that the strength of the porous filter may become insufficient. On the other hand, when the tensile strength of the porous laminate 1 is more than the upper limit, there is a concern that the production cost of the porous filter may increase unnecessarily. The term "tensile strength" refers to the tensile load at which the porous laminate 1 is broken by stretching in the first direction or the second direction, and specifically, refers to the breaking load when a porous laminate 1 with a sheet width of 5 mm is stretched at a chuck interval of 30 mm and a speed of 1,000 mm/min.

The upper limit of the absolute value of a difference between the tensile strength in the first direction (longitudinal direction) and the tensile strength in the second direction (lateral direction) of the porous laminate 1 is preferably 2.5 N and more preferably 1 N. When the absolute value of the difference is more than the upper limit, the porous filter is likely to become deformed.

The lower limit of the pressure resistance strength of the porous laminate 1 is preferably 1,200 kPa and more preferably 1,500 kPa. On the other hand, the upper limit of the pressure resistance strength of the porous laminate 1 is preferably 3,000 kPa and more preferably 2,500 kPa. When the pressure resistance strength of the porous laminate 1 is less than the lower limit, there is a concern that the strength of the porous filter may become insufficient and it may not be possible to use the porous filter under a high pressure. On the other hand, when the pressure resistance strength of the porous laminate 1 is more than the upper limit, there is a concern that the production cost of the porous filter may increase unnecessarily. The "pressure resistance strength" means the pressure measured at the time when air pressure is applied to a region with a diameter of 3 mm of a porous laminate 1 with pores being covered with rubber having a lower strength than the porous laminate 1, and air flows through the region.

The upper limit of the Gurley number G of the porous laminate 1 is preferably 100 seconds, more preferably 80 seconds, and still more preferably 50 seconds. On the other hand, the lower limit of the Gurley number G of the porous laminate 1 is preferably 1 second. When the Gurley number G of the porous laminate 1 is more than the upper limit, there is a concern that it may not be possible to sufficiently reduce the filtration cost of the porous filter. On the other hand, when the Gurley number G of the porous laminate 1 is less than the lower limit, there is a concern that the production cost of the porous filter may increase unnecessarily.

The upper limit of the bubble point B of the porous laminate 1 is preferably 600 kPa, more preferably 550 kPa, and still more preferably 500 kPa. On the other hand, the lower limit of the bubble point B of the porous laminate 1 is preferably 200 kPa. When the bubble point B of the porous laminate 1 is more than the upper limit, there is a concern that it may not be possible to sufficiently reduce the filtration cost of the porous filter. On the other hand, when the bubble point B of the porous laminate 1 is less than the lower limit, there is a concern that the production cost of the porous filter may increase unnecessarily.

The Gurley number G and the bubble point B of the porous laminate 1 satisfy the following expressions (1) and (2):

$$\log G > 3.7 \times 10^{-3} \times B - 0.8 \quad (1)$$

$$\log G < 4.9 \times 10^{-3} \times B + 0.45 \quad (2)$$

Figure 3:
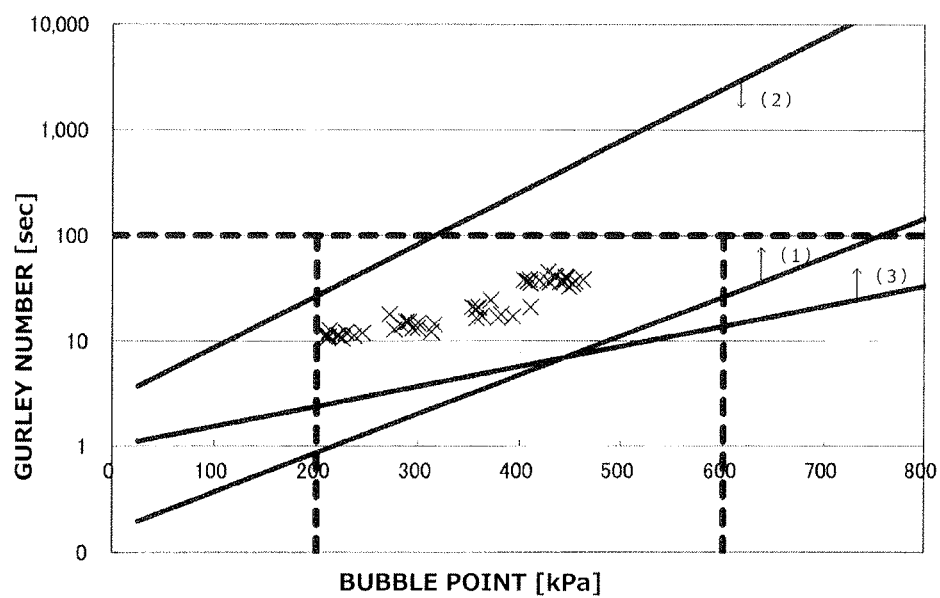
FIG. 3 is a graph showing regions which satisfy expressions (1), (2), and (3) and the Gurley number and the bubble point of porous laminates of porous filters in Example.

In the porous filter, even when the bubble point is increased in order to achieve required fine particle retention performance, the Gurley number can be maintained at a low level on the basis of the expression (2). Furthermore, the porous filter maintains the existing trade-off relationship between the bubble point and the Gurley number in which the Gurley number increases with an increase in the bubble point on the basis of the expression (1) within a certain range. Note that FIG. 3 shows the range in which the Gurley number G and the bubble point B satisfy the expressions (1) and (2).

The Gurley number G and the bubble point B of the porous laminate 1 may further satisfy the following expression (3):

$$\log G > 1.9 \times 10^{-3} \times B \qquad (3)$$

By setting the Gurley number and the bubble point to further satisfy the expression (3) whose slope is less steep than that of the expression (1), the rate of rise of the bubble point can be further reduced when the fine particle retention performance is increased, and the effect of reducing the filtration cost can be further enhanced. Note that FIG. 3 also shows the range in which the Gurley number G and the bubble point B satisfy the expressions (1), (2), and (3).

<Production Method for Porous Filter>

The porous filter can be obtained, for example, by a production method including a step of forming a support layer 2 and a retention layer 3 and a step of forming a porous laminate 1 by stacking the support layer 2 and the retention layer 3, followed by heating.

(Support Layer and Retention Layer Formation Step)

In the support layer and retention layer formation step, each of the support layer 2 and the retention layer 3 is formed. Specifically, a kneaded mixture of PTFE powder and a liquid lubricant is extruded into a sheet, and by biaxially stretching the resulting sheet, each of the support layer 2 and the retention layer 3, which is a biaxially stretched porous sheet, is formed.

The PTFE powder preferably has a high molecular weight. By using high-molecular-weight PTFE powder, it is possible to accelerate the growth of a fibrous skeleton while preventing excessive expansion of pores and split of the sheet during stretching. Furthermore, by reducing nodes in the sheet, it is possible to form a porous sheet in which micropores are densely located.

The lower limit of the number-average molecular weight of the PTFE powder constituting the retention layer 3 is preferably 4,000,000, more preferably 10,000,000, and still more preferably 15,000,000. On the other hand, the upper limit of the number-average molecular weight of the P E powder constituting the retention layer 3 is preferably 25,000,000. When the number-average molecular weight of the PTFE powder constituting the retention layer 3 is less than the lower limit, there is a concern that the porosity and strength of the retention layer 3 may become insufficient. On the other hand, when the number-average molecular weight of the PTFE powder constituting the retention layer 3 is more than the upper limit, there is a concern that it may become difficult to form a sheet. The "number-average molecular weight" is a value measured by gel filtration chromatography.

As the liquid lubricant, various lubricants that are usually used in extrusion methods can be used. Examples of the liquid lubricant include petroleum-based solvents, such as solvent naphtha and white oil; hydrocarbon oils, such as undecane; aromatic hydrocarbons, such as toluol and xylol; alcohols; ketones; esters; silicone oils; fluorochlorocarbon oils; solutions obtained by dissolving a polymer such as polyisobutylene or polyisoprene in any of these solvents; and water or aqueous solutions containing a surfactant. These liquid lubricants can be used alone or as a mixture of two or more thereof. However, from the viewpoint of uniformity of mixing, it is preferable to use a liquid lubricant composed of a single component.

The lower limit of the amount of the liquid lubricant mixed is preferably 10 parts by mass, more preferably 16 parts by mass, relative to 100 parts by mass of the PTFE powder. On the other hand, the upper limit of the amount of liquid lubricant mixed is preferably 40 parts by mass and more preferably 25 parts by mass. When the amount of liquid lubricant mixed is less than the lower limit, there is a concern that extrusion may become difficult. On the other hand, when the amount of liquid lubricant mixed is more than the upper limit, there is a concern that compression molding, which will be described later, may become difficult.

Furthermore, the material for forming each of the support layer 2 and the retention layer 3 may be incorporated with additives other than the liquid lubricant according to intended use. Examples of the other additives include pigments for coloring; and for the purpose of improving wear resistance, preventing cold flow, and facilitating the formation of pores, inorganic fillers, such as carbon black, graphite, silica powder, glass powder, glass fibers, silicates, and carbonates; metal powder, metal oxide powder, metal sulfide powder, and the like. Furthermore, for the purpose of promoting the formation of a porous structure, substances that can be removed or decomposed by heating, extraction, dissolution, or the like, such as ammonium chloride, sodium chloride, plastics other than PTFE, and rubbers, may be added in the form of a powder or solution.

In this step, first, after the PTFE powder and the liquid lubricant are mixed, the mixture is compression-molded into a block using a compression molding machine. Then, the resulting block is extruded into a sheet at room temperature (e.g., 25° C.) to 50° C., for example, at a speed of 10 to 30 mm/min. Furthermore, by rolling the resulting sheet using calender rolls or the like, a PTFE sheet having an average thickness of 250 to 350 μm is obtained.

The liquid lubricant contained in the PTFE sheet may be removed after the sheet has been stretched, but is preferably removed before stretching. The liquid lubricant can be removed by heating, extraction, dissolution, or the like. In the case where heating is performed, for example, by rolling the PTFE sheet using heat rolls at 130° C. to 220° C., the liquid lubricant can be removed. In the case where a liquid lubricant having a relatively high boiling point, such as a silicone oil or fluorochlorocarbon oil, is used, it is suitable to remove the liquid lubricant by extraction.

After the PTFE sheet has been formed, by stretching the PTFE sheet in the first direction (longitudinal direction) and in the second direction (lateral direction) in this order, each of a biaxially stretched porous sheet constituting the support layer 2 and a biaxially stretched porous sheet constituting the retention layer 3 is obtained. Note that, by stretching the PTFE sheet constituting the support layer 2 and the PTFE sheet constituting the retention layer 3 at different stretching ratios, the mean pore diameter and the like can be adjusted. Furthermore, stretching may be performed in multiple stages.

The PTFE sheet is preferably stretched at a high temperature in order to produce a dense porous structure. The lower limit of the temperature during stretching is preferably 200° C. and more preferably 250° C. On the other hand, the upper limit of the temperature during stretching is preferably 300° C. and more preferably 280° C. When the temperature during stretching is less than the lower limit, there is a concern that the pore diameter may be excessively increased. On the other hand, when the temperature during stretching is more than the upper limit, there is a concern that the pore diameter may be excessively decreased.

Furthermore, the biaxially stretched porous sheet is preferably subjected to thermal fixing after stretching. By performing thermal fixing, the biaxially stretched porous sheet is prevented from shrinking, and the porous structure can be more reliably maintained. Specifically, thermal fixing may be performed, for example, by a method in which, with both ends of the biaxially stretched porous sheet being fixed, the biaxially stretched porous sheet is held at a temperature of 200° C. to 500° C. for 0.1 to 20 minutes. In the case where stretching is performed in multiple stages, thermal fixing is preferably performed after stretching in each stage.

The lower limit of the average thickness of the biaxially stretched porous sheet obtained through the stretching is preferably 10 μm and more preferably 15 μm. On the other hand, the upper limit of the average thickness of the biaxially stretched porous sheet is preferably 40 μm and more preferably 35 μm. When the average thickness of the biaxially stretched porous sheet is less than the lower limit, or more than the upper limit, there is a concern that it may not be possible to obtain the support layer 2 or the retention layer 3 with a desired thickness.

(Porous Laminate Formation Step)

In the porous laminate formation step, by stacking the support layer 2 and the retention layer 3 obtained in the support layer and retention layer formation step, followed by heating, a porous laminate 1 is formed.

Specifically, first, a support layer 2, a retention layer 3, and a support layer 2 are stacked in this order, and by heating the resulting laminate, the individual layers are fusion bonded to one another at the boundaries to form an integrated structure. Thereby, a porous laminate 1 is obtained. The lower limit of the heating temperature is preferably 327° C., which is the glass transition point of PTFE, and more preferably 360° C. On the other hand, the upper limit of the heating temperature is preferably 400° C. When the heating temperature is less than the lower limit, there is a concern that fusion bonding of the individual layers may become insufficient. On the other hand, when the heating temperature is more than the upper limit, there is a concern that the individual layers may become deformed. Furthermore, the heating time is preferably 0.5 to 3 minutes.

(Hydrophilization Treatment)

The porous laminate 1 obtained as described above may be subjected to hydrophilization treatment. In the hydrophilization treatment, the porous laminate 1 is impregnated with a hydrophilic material, and crosslinking is performed. Examples of the hydrophilic material include polyvinyl alcohol (PVA), an ethylene-vinyl alcohol copolymer (EVOH), and an acrylate resin. Among these materials, PVA which is likely to adsorb to surfaces of PTFE fibers and with which impregnation can be uniformly performed is preferable.

Specifically, the hydrophilization treatment can be performed, for example, in accordance with the procedure described below. First, the porous laminate 1 is immersed in isopropyl alcohol (IPA) for 0.25 to 2 minutes, and then immersed in an aqueous solution of PVA with a concentration of 0.5% to 0.8% by mass for 5 to 10 minutes. Subsequently, after the porous laminate 1 is immersed in pure water for 2 to 5 minutes, crosslinking is performed by addition of a crosslinking agent or electron beam irradiation. After the crosslinking, the porous laminate 1 is washed with pure water and dried at normal temperature (25° C.) to 80° C. Thereby, the surface of the porous laminate 1 can be made hydrophilic. As the crosslinking agent, for example, an agent that forms glutaraldehyde crosslinking, terephthalaldehyde crosslinking, or the like may be used. Furthermore, as the electron beam, an electron beam of 6 Mrad may be used.

<Advantages>

In the porous filter, since the Gurley number and the bubble point of the porous laminate 1 satisfy the expressions (1) and (2), even when the bubble point is increased, the increase in the Gurley number is reduced. That is, in the porous filter, while reducing the filtration cost by suppressing an increase in pressure drop, it is possible to improve fine particle retention performance. Furthermore, since the materials and design method for existing porous filters are applicable to the porous filter, the porous filter can be produced at low cost.

Furthermore, in the porous filter, the porous laminate 1 includes a pair of support layers 2 disposed as outermost layers and a retention layer 3 disposed between the pair of support layers 2. Since the support layers 2 serve as protective members for the retention layer 3, the porous filter can enhance the mechanical strength and life of the porous laminate 1 while improving retention performance.

Other Embodiments

It is to be understood that the embodiments disclosed this time are illustrative in all aspects and not restrictive. The present invention is not limited to the embodiments, but is determined by appended claims. The present invention is intended to embrace equivalents of the scope of the claims and all modifications within the scope of the claims.

Figure 2:
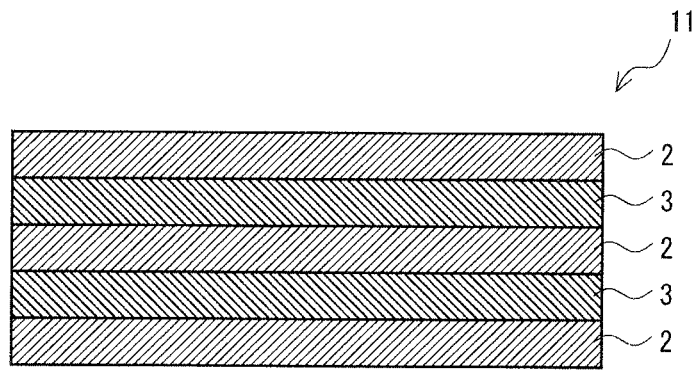
FIG. 2 is a schematic cross-sectional view of a porous filter according to an embodiment different from that of FIG. 1.

In the embodiment described above, the porous laminate 1 has a three-layered structure. However, the porous laminate of the porous filter may have a two-layered structure or a four or more-layered structure. For example, as shown in FIG. 2, a porous filter including a porous laminate 11 having a five-layered structure in which two retention layers 3 are disposed between a pair of outermost support layers 2, and a support layer 2 is disposed between the pair of retention layers 3 is also within the intended scope of the present invention. In this case, the pore diameter and the like of the inner support layer are preferably set to be the same as those of the outermost support layers.

EXAMPLES

The present invention will be described in more detail below on the basis of examples. However, it is to be understood that the present invention is not limited to the examples.

Using the production method described above, a plurality of porous filters including porous laminates 1 having a three-layered structure shown in FIG. 1, porous laminates having a four-layered structure including two support layers and two retention layers disposed between the pair of support layers, and porous laminates 11 having a five-layered structure shown in FIG. 2 including two support layers, two retention layers disposed between the pair of support layers, and one support layer disposed between the pair of retention layers were produced.

The Gurley number of each of the porous filters was measured, in accordance with JIS-P8117 (2009), as the time required for 100 cm$^3$ of air to pass through 6.45 cm$^2$ of a sample at an average differential pressure of 1.22 kPa. Furthermore, the bubble point of each of the porous filters was measured in accordance with ASTM-F-316, using isopropyl alcohol as a test liquid. The results are shown by plots in FIG. 3.

The Gurley number and the bubble point of each of the porous filters satisfy the expressions (1) and (2) described above. In the porous filters, while reducing the filtration cost by suppressing an increase in pressure drop, it is possible to improve fine particle retention performance, and the porous filters can be produced at low cost.

INDUSTRIAL APPLICABILITY

As described above, in the porous filter of the present invention, it is possible to achieve both improvement in fine particle retention performance and reduction in filtration cost, and therefore, the porous filter can be suitably used as a microfiltration filter.

The invention claimed is:

1. A porous filter comprising a porous laminate in which a plurality of biaxially stretched porous sheets made of PTFE are stacked,
    wherein the porous laminate includes a pair of support layers and a retention layer disposed between the pair of support layers,
    the average thickness of the retention layer is from 8 μm to 25 μm,
    the mean pore diameter of the retention layer is from 0.01 μm to 0.45 μm,
    the porosity of the retention layer is from 50% to 90%,
    the average thickness of each support layer is from 2 μm to 20 μm,
    the mean pore diameter of each support layer is from two times to ten times the mean pore diameter of the retention layer,
    the porosity of each support layer is from one time to two times the porosity of the retention layer,
    the porous laminate is formed by stacking the support layers on opposite sides of the retention layer such that the retention layer is sandwiched between the support layers, and heating the resulting laminate such that the individual layers are fusion bonded to one another at the boundaries thereof, wherein the laminate is heated at a temperature of 327° C. to 400° C. for a period of 0.5 minute to 3.0 minutes to form an integrated structure, and
    wherein G is the coefficient of the Gurley number of the porous laminate, B is the coefficient of the bubble point of the porous laminate, and the coefficients of the Gurley number and the bubble point satisfy the following expressions (1) and (2):

$$\log G > 3.7 \times 10^{-3} \times B - 0.8 \quad (1)$$

$$\log G < 4.9 \times 10^{-3} \times B + 0.45 \quad (2)$$

wherein, the Gurley number is measured in seconds (s) and the bubble point is measured in kilopascal (kPa).

2. The porous filter according to claim 1, wherein the coefficients of the Gurley number and the bubble point of the porous laminate satisfy the following expression (3):

$$\log G > 1.9 \times 10^{-3} \times B \quad (3).$$

3. The porous filter according to claim 1, wherein the Gurley number of the porous laminate is 100 seconds or less.

4. The porous filter according to claim 1, wherein the bubble point of the porous laminate is 200 to 600 kPa.

* * * * *